United States Patent
Przymusinski et al.

(10) Patent No.: US 8,346,430 B2
(45) Date of Patent: Jan. 1, 2013

(54) METHOD FOR THE GENERATING OPERATING SOFTWARE ON A CONTROL DEVICE FOR A MOTOR VEHICLE AS WELL AS CONTROL DEVICE

(75) Inventors: Achim Przymusinski, Lappersdorf (DE); Frank Queisser, Regensburg (DE); Wolfgang Östreicher, Winterthur (CH)

(73) Assignee: Continental Automotive GmbH, Hannover (DE)

( * ) Notice: Subject to any disclaimer, the term of this patent is extended or adjusted under 35 U.S.C. 154(b) by 739 days.

(21) Appl. No.: 12/331,491

(22) Filed: Dec. 10, 2008

(65) Prior Publication Data

US 2009/0150020 A1 Jun. 11, 2009

(51) Int. Cl.
*G06F 19/00* (2011.01)
(52) U.S. Cl. ...................................... 701/31.4
(58) Field of Classification Search .............. 700/95, 700/108, 115, 116, 117, 213, 215, 225, 226; 717/168; 701/29.6, 31.4
See application file for complete search history.

(56) References Cited

U.S. PATENT DOCUMENTS

| | | | |
|---|---|---|---|
| 7,610,176 B2* | 10/2009 | Tu et al. ................. | 702/187 |
| 2001/0044677 A1 | 11/2001 | Bauer et al. ................. | 701/1 |
| 2005/0097541 A1* | 5/2005 | Holland ................. | 717/168 |
| 2006/0129640 A1* | 6/2006 | Farchmin et al. ........... | 709/203 |
| 2006/0179426 A1* | 8/2006 | Koo et al. ................. | 717/140 |
| 2007/0028208 A1* | 2/2007 | Maki ................. | 717/106 |
| 2008/0005733 A1* | 1/2008 | Ramachandran et al. .... | 717/168 |
| 2008/0052665 A1* | 2/2008 | Bray ................. | 717/105 |
| 2008/0270427 A1* | 10/2008 | Franke et al. ................. | 707/100 |

FOREIGN PATENT DOCUMENTS

| | | |
|---|---|---|
| DE | 19964013 | 12/1999 |
| DE | 10153447 | 10/2001 |
| DE | 10234063 | 7/2002 |
| WO | 2005/006091 | 1/2005 |
| WO | 2006/100232 | 3/2006 |

OTHER PUBLICATIONS

P. Frenzel et al.; "Extending the Reflexion Method for Consolidating Software Variants into Product Lines"; Working Conference on Reverse Engineering; pp. 160-169, Oct. 31, 2007.

* cited by examiner

*Primary Examiner* — James Trammell
*Assistant Examiner* — Michael D Lang
(74) *Attorney, Agent, or Firm* — King & Spalding L.L.P.

(57) ABSTRACT

A method for generating operating software on a control device for a motor vehicle by executing control software in a production line end computer or in the control device, has the following steps: a) Executing a diagnosis function in the motor vehicle, with which the configuration of the motor vehicle can be established so that the functions to be performed by the control device (1) are clearly defined, b) Selecting only from among the necessary software components from an external data source (2), so that the configuration of the motor vehicle can be mapped with the operating software on the control device (1), and c) Generating the component-individual operating software on the control device (1) by inclusion of the selected software components.

20 Claims, 1 Drawing Sheet

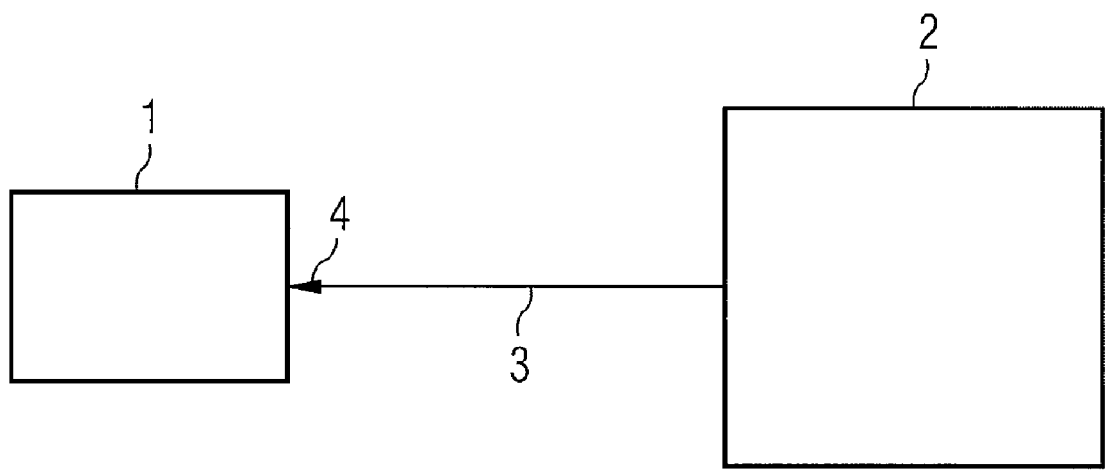

METHOD FOR THE GENERATING OPERATING SOFTWARE ON A CONTROL DEVICE FOR A MOTOR VEHICLE AS WELL AS CONTROL DEVICE

CROSS-REFERENCE TO RELATED APPLICATIONS

This application claims priority to German Patent Application No. 10 2007 059 524.9 filed Dec. 11, 2007, the contents of which is incorporated herein by reference in its entirety.

TECHNICAL FIELD

The present invention relates to a method for generating operating software on a control device for a motor vehicle. The invention also relates to a control device for a motor vehicle. Control devices in motor vehicles are equipped with operating software in order to enable them in each case to perform their intended tasks in the motor vehicle.

BACKGROUND

In current systems, executable programs are generated in the preliminary stages of production and are made available to the assembly line as a finished product. Variants in the target systems, i.e. individual features of the control devices in question, influencing the executable programs on said devices are catered for either in the parameterizing and the activation of code parts or through automatic selection of already coded variants. This involves storing the operating software with its possible variants and code parts in a memory of the control device.

A problem in this process is the diversity of possible variants of the operating software in practice. In particular, with the usual variant coding and parameterizing of the software, many built-in component variants, such as for example vehicle-specific communication protocols or OEM-specific function strategies cannot be configured, or only by using up a large amount of resources on the microcontroller of the control device. In this process, many different software versions or large and fast flash memories of the control device are particularly necessary, in which the different possible variants are stored and executed. As a result, there is a high demand for resources; in particular, storage space and run time on the control device memory. The result is high development costs and logistics costs or a higher price of the parts.

SUMMARY

According to various embodiments, individual operating software can be provided for a control device with high flexibility and a low demand for resources.

According to an embodiment, a method for generating operating software on a control device for a motor vehicle by executing control software in a production line end computer or in the control device may comprise the following steps: a) Executing a diagnosis function in the motor vehicle, with which the configuration of the motor vehicle can be established so that the functions to be performed by means of the control device are clearly defined, b) Selecting only from among the necessary software components from an external data source, so that the configuration of the motor vehicle can be mapped with the operating software on the control device, and c) Generating the component-individual operating software on the control device by inclusion of the selected software components.

According to a further embodiment, the operating software may be generated in the production line end computer containing the external data source and is subsequently transferred to the control device. According to a further embodiment, the operating software may be selected from the external data source and is only assembled into executable operating software on the control device. According to a further embodiment, the individual operating software may be composed of a plurality of software components that have been made available on the external data source. According to a further embodiment, the individual operating software may be generated from basic software that has been made available on the external data source and likewise at least one individual item of difference software is generated on an external data source for the use of the control device in question. According to a further embodiment, a plurality of storage areas can be defined and allocated specific functions on a program memory of the control device with, for the generation of the individual operating software, the storage areas being filled at least partially with software variants that have been made available on the external data source. According to a further embodiment, for the generation of the individual operating software, data from an external data source can be transferred by at least one of means of a computer network and means of the Internet to the control device. According to a further embodiment, the operating software to be generated individually on the control device may be selected and/or generated by means of a control software. According to a further embodiment, the control software can be contained in a memory of the control device. According to a further embodiment, the operating software to be generated individually on the control device can be selected and/or generated by a signal from another component of the motor vehicle.

According to another embodiment, a computer program product may store computer executable code, wherein the computer executable code when executed on a production line end computer or in a control device for a vehicle performs a method for generating operating software for the control device for a motor vehicle according to the above described method.

According to yet another embodiment, a control device for a motor vehicle may be operable to perform the above described method.

BRIEF DESCRIPTION OF THE DRAWINGS

The invention is explained in more detail below with reference to an exemplary embodiment specified in the schematic FIGURE of the drawing. The single FIGURE shows schematically a control device connected to an external data source for the generation of the operating software.

DETAILED DESCRIPTION

For a method described in the introduction for generating operating software on a control device for a motor vehicle, according to various embodiments, from an external data source, individual operating software for the random use of the control device in question is generated on the control device. According to another embodiment, a control device of the type mentioned in the introduction may have operating software that is generated in an individual way according to the above described method.

According to various embodiments, the operating software, in particular real time software, can be created for the target system in question custom-made from an external data source. To this end, the operating software is selected from or composed of an external data source and installed or programmed on the control device. In this process, it is possible to select the software from a data source and only to compile the software components on the control device for a code which can be run, i.e. in particular to compile and link or assemble it out of already linked code parts. However, it is also possible to already compile and link the software on the external data source and to transfer the complete software to the control device. In this way, additional run time and memory of the control device is saved.

The operating software is executable program code for real time (embedded) systems, in particular control devices (ECU), which in each case enables the functions provided for the execution thereof. The operating software is in particular generated in the main memory or in the program memory of the control device. The external data source is a data source which is not provided on the control device itself. In particular the data source, unlike in the prior art, is not the main memory or the program memory of the control device. For the generation of the software, the external data source can be connected to the control device in a suitable manner.

In such cases the custom-made, optimized and executable code according to various embodiments can be generated at a point in time that is as late as possible on the control device, for example, at the production line end of the manufacturer of the control device, at the production line end of the automotive manufacturer, in service workshops or even directly by the end customer of the motor vehicle in the field. At the earliest the operating software is generated in accordance with an embodiment after the configuration of the motor vehicle is defined to such an extent that the functions to be fulfilled by means of the control device in question are uniquely defined.

The generation of the operating software from an external data source means that expensive resources are saved on the control device, in particular storage space and run time. In particular the wealth of variants of the possible operating software does not need to be stored on the control device. Instead the possible variants of the operating software can be made available on the external data source and be selected by it. This reduces the costs of parts. In this process, the control device can optimally be adapted to the special conditions in operation. In this way, for example, specific motor vehicle configurations or a control provided by means of the control device or the evaluation of certain actuators or sensors can be taken into consideration (ASICS, sensor interfaces/actuator interfaces, etc.). Other configurations determined by the components to be controlled by the control device can also be taken into consideration. Likewise, it is possible to reproduce ECU configurations, component configurations, country configurations, regional configurations, or customer-specific configurations with the operating software on the control device. Because the program code generated on the control device can be designed for individual components, it is for example possible to compensate for higher manufacturing tolerances of mechanical components by supplying specific software algorithms or to implement individual codings bound to the components to be controlled. It is also possible to take account in the generation of the operating software of the composition of the fuel (quality, type, etc.) in the tank of the motor vehicle or environmental data such as for example temperatures (permanent cold or heat) or the quality of the air.

A plurality of application variants can be catered for in the various embodiments with only one control device, so that logistics costs can be saved. The configuration of the control device with the operating software is still possible on exchanging components of the motor vehicle or even at the end customer of the motor vehicle. It is thus conceivable to sell certain software functions as a product for the motor vehicle that can then be installed by the driver himself.

In accordance with an embodiment, the operating software can be generated in a component that contains the external data source and subsequently be transferred to the control device. In the case of such a component that contains the external data source, said component can for example be a computer at the production line end (production line end computer) of the production line of the control device or the motor vehicle. However, said component can also for example be a component that is controlled by the control device, such as for example a sensor or an actuator. Therefore, a test can for example be carried out in a production line end computer to determine which components have been built-in into the motor vehicle and corresponding software can be generated for this configuration in the production line end computer. Subsequently, this software can be transferred to the control device.

In accordance with a further embodiment, the individual operating software can be assembled from a plurality of software components for which provision has been made on the external data source. In this embodiment, the operating software is thus generated by means of compiling and linking individually assembled software components and subsequent programming on the control device. In this embodiment, a pool of software modules for example in the form of an OBJ code, libraries, or a C code is made available to the automotive manufacturer or the manufacturer of the control device. The software pool can also be provided component-specifically, i.e. depending on the components that are to be controlled by means of the control device (for example basic code for the ECU or the code for the control of a special actuator/sensor, etc.). Depending on the motor vehicle or the ECU configuration, the control device software is for example generated individually during the manufacturing of the motor vehicle or the control device and subsequently programmed. To this end, the software architecture and the interfaces for the code variants for the control device type in question are standardized. The assembly of the software components (compiling and linking) can still take place in the external data source, for example, parallel to the manufacture of control devices or the motor vehicle. Subsequently, for example at the production line end in question, the assembled operating software can then be transferred to the control device and be generated in this way on the control device. As a result, resources, in particular run time, are saved on the control device memory. However, it is also conceivable already to carry out the compiling and the linking on the control device itself, i.e. to transfer the software components beforehand from the external data source to the control device. The software components can for example be stored in a memory of a production line end computer or in memories of a component or different components that can be controlled by means of the control device in each case and thus made available in this way. A combination of storing software components in a memory of the production line end computer and in memories of a component that can be controlled by means of the control device is also possible in each case.

In accordance with a further embodiment, the individual operating software can be generated from basic software that has been made available on the external data source and at least one item of difference software that has likewise been generated on an external data source for the respective use of the control device. In this procedure general basic software or master software exists which can be combined into a new software code with one individual difference software or a plurality of individual difference software to be selected. In this process, the difference software in question corresponds to the difference between the basic software and the variants of the operating software needed for the use of the control device. In order to generate the operating software, the difference software can for example replace, change, amend, or supplement parts of the basic software. In principle, such a difference data record method is known from WO 2006/100232 A1. In principle, this method can also be used in the various embodiments. However, the method known from WO 2006/100232 A1 is only used for the parameterizing (data record configuration) and not for generating a complete operating software of the control device. In addition, in the case of the known method, the basic data record and the respective difference data records in question are stored in a memory of the control device. Once again this results in a high demand for resources. By contrast, in accordance with according to various embodiments the operating software is generated from an external data source. In this process, the data sources for the basic software and the difference software can be the same data source or different data sources. The master software and the difference software can for example be stored compressed at hex-file level, if required and, depending on the motor vehicle configuration or the ECU configuration, can be assembled into one individual variant software. An advantage of this embodiment may be that the fast and expensive memory of the control device (for example flash memory) can be used optimally and the possible variants do not already have to be defined during the development of the control device. Instead variants can be taken in account even at a later date by corresponding difference software supplied later without influencing existing variants and master software. In addition there is a large degree of independence regarding the possible interfaces and parameters.

In accordance with a further embodiment a plurality of storage areas can be defined on a program memory of the control device and allocated to certain functions, with the storage areas being filled at least partially with software variants that have been made available on the external data source for the generation of the individual operating software. In this embodiment functions of the control device and the related storage areas, in particular regarding their address and size, are thus defined statically in the program memory of the control device and if necessary linked. To generate the operating software, for example at the production line end, in the workshop or in the field, these areas are filled with the function variants for the function in question. After the completed programming of the operating software, the desired function variants are contained in the program memory. In this case, the associated RAM occupation takes place dynamically. This embodiment may have the advantage that even "foreign software", which is not made available by means of the manufacturer of the control device, can also not be integrated on the control device, for example on hex-code level. In this case, it is required that the interfaces and the storage areas have already been clearly defined during the development time of the control device. In addition the size of the storage areas in question must be designed in such a way that the largest software variant that is in each case conceivable for this storage area can be stored in said area.

The external data source can for example be an external, preferably cost-effective storage medium, for example a cost-effective flash memory. The external data source can also be provided as a memory in other control devices or components built-in into the motor vehicle, as a bar code or on a transponder chip on mechanical components of the motor vehicle, as a memory in the End-of-Line (EOL) computer, as a memory in the service tester and on other storage media such as compact discs, etc. In particular the external data source can be a storage medium of the components to be controlled by means of the control device in each case. The transfer of data from the external data source to the control device can for example take place by means of a data line, for example a serial connection. However, it is also conceivable that for the generation of the individual operating software, data is transferred from the external data source by means of a computer network and/or by means of the Internet to the control device. A transfer of data from a data source provided at the manufacturer of the component to be controlled by means of the control device, the manufacturer of the control device or the manufacturer of the motor vehicle to the control device is thus for example possible in this way.

Different possibilities are available in order to select and program the desired software variant on the control device. This can be done by means of an external tool such as for example corresponding software or by the user in question. The operating software that is to be generated individually on the control device can in particular also be selected and/or generated by means of control software. In accordance with one embodiment, the control software can be contained in a memory of the control device. The memory of the control device having the control software can for example be the main memory or the program memory of the control device. The control device itself can thus test with its control software how to configure and program itself and said device can then initiate the re-programming by itself. This can for example take place based on how the control device (for example ASICs, sensor interfaces, etc.) or connected components or component parameters in the motor vehicle. The basis for the selection and/or generation of the operating software can for example be an evaluation of a corresponding diagnosis function of the control software or a special configuration program on the control device.

In accordance with a further embodiment, the operating software that is to be generated individually on the control device can be selected and/or generated by means of a signal from another component of the motor vehicle, in particular another control device. In accordance with this embodiment, the programming of the operating software can be initiated by means of an external signal, i.e. a signal from an external device. For example, a corresponding signal can be sent by means of a CAN bus from another control device in the motor vehicle such as for example a navigation system. Such an external control device, for example a navigation system, can obtain the present configuration through data transfer from a central source or can, for example, determine the desired configuration depending on the position of the motor vehicle (for example, country-specific or terrain-specific). The signal can come from external control software, which then also takes over the generation of the operating software on the control device. It is however also conceivable for control software to be present on the control device for the generation of the operating software, which is in this case only activated by means of the signal from the external device and subsequently carries out the corresponding programming. The operating software to be generated in each case can also be generated depending on the composition of the fuel in the tank (quality, type, etc.) or depending on the environmental data such as for example the temperature or the quality of the air.

According to yet another embodiment, a computer program has program code means with which the method in accordance with other embodiments can be carried out if the computer program is run on a computer or on a computer network. The program code means can be stored on a machine-readable data carrier. A corresponding computer program product is thus also included in which the program code means are stored on a machine-readable data carrier. In addition, according to various other embodiments, a data carrier can be provided on which a computer program is stored, that can execute the above mentioned method after having been loaded into a main memory and/or a program memory of a computer or a computer network.

The single FIGURE shows schematically a control device 1 (ECU) for a motor vehicle that is not shown in greater detail. In the given example, the control device 1 likewise serves to control the motor vehicle sensors, which are for example likewise not shown, such as parking distance sensors. In addition, an external data source 2, here a cost-effective flash memory 2 is shown in the FIGURE. In the example shown the data source 2 is delivered together with the components to be controlled by means of the control device 1, here the parking distance sensors.

In order to generate individual operating software on the control device 1, which enables the control device 1 to control the parking distance sensors, the external data memory 2 can be connected via a serial connection to the control device 1 by means of a data line 3. As illustrated by means of the arrow 4 on the data line 3, data is transferred mainly from the external data source 2 to the control device 1. However, a data transfer in the opposite direction is naturally also possible.

There are a plurality of software components for the control of the different motor vehicle components on the data memory 2 and the example shows the different parking distance sensors for the different motor vehicle configurations. Control software is downloaded to the main memory of the control device 1. The control software has a diagnosis function by means of which the purpose for which the control device 1 is to be used later can be determined.

In the delivered condition, the control device 1 still does not have complete operating software for later operation. In order to generate said operating software, the control software carries out the diagnosis function. As a result, the control software establishes that the control device 1 is intended for controlling the parking distance sensors in the specific way for the motor vehicle. In this case it is in particular established by the control software which type of parking distance sensors are to be controlled and read out in what way by means of the control device 1 in question in the respective motor vehicle. In accordance with this result, the control software selects from a plurality of software components that have been made available on the data source 2 for the planned control of sensors by means of the control device 1. The selected components are then still compiled or linked or assembled from already linked code parts on the external data memory 2 by means of the control software 1 and thereby combined into an operating software. Subsequently, the combined software for the generation of the operating software is transferred by means of the data line 3 from the data source 2 to the program memory of the control device 1 and installed there.

As a result, the operating software that is required for the specific use of the control device 1 is thus generated individually by means of the control software on the control device 1, and in particular in the program memory of the control device 1.

The operating software is generated on the control device 1 in the example shown not until the production line end of the manufacturer of the motor vehicle, in which the control device 1 is installed. On the other hand, the diagnosis function and the subsequent selection and compiling or linking of the software components for the operating software can however already take place during the manufacture of the control device or during the manufacture of the motor vehicle before the production line end. At this point in time, the configuration of the motor vehicle and in particular the configuration of the control device 1 is already clearly established.

A flexible, individual configuration of the control device 1 is possible in accordance with various embodiments with, because an external data source 2 is used, expensive resources being saved on the control device 1, in particular storage space and run time on the memory of the control device 1.

What is claimed is:

1. A method for generating operating software on an onboard control device of a motor vehicle by communicating with an external data source storing a plurality of software components in a non-executable state, comprising the following steps:
    a) at the onboard control device of the motor vehicle, executing a diagnosis function of control software stored in the onboard control device of the motor vehicle, with which the configuration of the motor vehicle can be established so that functions to be performed by the control device are identified,
    b) the control software at the onboard control device communicating with the external data source to select from the plurality of software components stored in a non-executable state on the external data source only software components necessary for performing the identified functions to be performed by the control device, and
    c) the control software at the onboard control device initiating the generation of operating software on the control device from external components stored in a non-executable state by either:
        causing the selected software components in the non-executable state to be compiled or linked in the external data source to generate executable operating software for the control device, which executable operating software is then transferred from the external data source to the onboard control device, or
        causing the selected software components in the non-executable state to be transferred from the external data source to the onboard control device and then compiled or linked in the onboard control device to generate executable operating software for the control device.

2. The method according to claim 1, wherein the operating software is generated in a production line end computer containing the external data source and is subsequently transferred to the control device.

3. The method according to claim 1, wherein the operating software is selected from the external data source and is only assembled into executable operating software on the control device.

4. The method according to claim 1, wherein the individual operating software is composed of a plurality of software components that have been made available on the external data source.

5. The method according to claim 1, wherein the individual operating software is generated from basic software that has been made available on the external data source and likewise at least one individual item of difference software is generated on an external data source for the use of the control device in question.

6. The method according to claim 1, wherein a plurality of storage areas are defined and allocated specific functions on a program memory of the control device with, for the generation of the individual operating software, the storage areas being filled at least partially with software variants that have been made available on the external data source.

7. The method according to claim 1, wherein, for the generation of the individual operating software, data from an external data source is transferred by at least one of means of a computer network and means of the Internet to the control device.

8. The method according to claim 1, wherein, the operating software to be generated individually on the control device is at least one of selected and generated by means of a control software.

9. The method according to claim 8, wherein the control software is contained in a memory of the control device.

10. The method according to claim 1, wherein the operating software to be generated individually on the control device is at least one of selected and generated by a signal from another component of the motor vehicle.

11. A computer program product storing computer executable code, wherein the computer executable code when executed in an onboard control device of a motor vehicle performs a method for generating operating software for the control device with the following steps:
 a) at the onboard control device of the motor vehicle, executing a diagnosis function of control software stored in the onboard control device of the motor vehicle, with which the configuration of the motor vehicle can be established so that functions to be performed by the control device are identified,
 b) the control software at the onboard control device communicating with the external data source to select from the plurality of software components stored in a non-executable state on the external data source only software components necessary for performing the identified functions to be performed by the control device, and
 c) the control software at the onboard control device initiating the generation of operating software on the control device from external components stored in a non-executable state by either:
  causing the selected software components in the non-executable state to be compiled or linked in the external data source to generate executable operating software for the control device, which executable operating software is then transferred from the external data source to the onboard control device, or
  causing the selected software components in the non-executable state to be transferred from the external data source to the onboard control device and then compiled or linked in the onboard control device to generate executable operating software for the control device.

12. An onboard control device of a motor vehicle operable to generate executable operating software by communicating with an external data source storing a plurality of software components in a non-executable state, comprising the following steps:
 a) at the onboard control device of the motor vehicle, executing a diagnosis function of control software stored in the onboard control device of the motor vehicle, with which the configuration of the motor vehicle can be established so that functions to be performed by the control device are identified,
 b) the control software at the onboard control device communicating with the external data source to select from the plurality of software components stored in a non-executable state on the external data source only software components necessary for performing the identified functions to be performed by the control device, and
 c) the control software at the onboard control device initiating the generation of operating software on the control device by either:
  causing the selected software components in the non-executable state to be compiled or linked in the external data source to generate executable operating software for the control device, which executable operating software is then transferred from the external data source to the onboard control device, or
  causing the selected software components in the non-executable state to be transferred from the external data source to the onboard control device and then compiled or linked in the onboard control device to generate executable operating software for the control device.

13. The control device according to claim 12, wherein the operating software is generated in a production line end computer containing the external data source and is subsequently transferred to the control device.

14. The control device according to claim 12, wherein the operating software is selected from the external data source and is only assembled into executable operating software on the control device.

15. The control device according to claim 12, wherein the individual operating software is composed of a plurality of software components that have been made available on the external data source.

16. The control device according to claim 12, wherein the individual operating software is generated from basic software that has been made available on the external data source and likewise at least one individual item of difference software is generated on an external data source for the use of the control device in question.

17. The control device according to claim 12, wherein a plurality of storage areas are defined and allocated specific functions on a program memory of the control device with, for the generation of the individual operating software, the storage areas being filled at least partially with software variants that have been made available on the external data source.

18. The control device according to claim 12, wherein, for the generation of the individual operating software, data from an external data source is transferred by at least one of means of a computer network and means of the Internet to the control device.

19. The control device according to claim 12, wherein, the operating software to be generated individually on the control device is at least one of selected and generated by means of a control software.

20. The control device according to claim 19, wherein the control software is contained in a memory of the control device.

* * * * *

UNITED STATES PATENT AND TRADEMARK OFFICE
CERTIFICATE OF CORRECTION

PATENT NO. : 8,346,430 B2  
APPLICATION NO. : 12/331491  
DATED : January 1, 2013  
INVENTOR(S) : Achim Przymusinski et al.

Page 1 of 1

It is certified that error appears in the above-identified patent and that said Letters Patent is hereby corrected as shown below:

Title page,
Item (30) Foreign Application Priority Data, is missing, insert
-- December 11, 2007 (DE).......................10 2007 059 524.9 --.

Signed and Sealed this
Twenty-sixth Day of February, 2013

Teresa Stanek Rea
*Acting Director of the United States Patent and Trademark Office*